United States Patent [19]

Rao et al.

[11] Patent Number: 4,555,269

[45] Date of Patent: * Nov. 26, 1985

[54] HYDROLYTICALLY STABLE POLYMERS FOR USE IN OIL FIELD CEMENTING METHODS AND COMPOSITIONS

[75] Inventors: S. Prabhakara Rao, Parma, Ohio; John F. Burkhalter, Duncan, Okla.

[73] Assignee: Halliburton Company, Duncan, Okla.

[*] Notice: The portion of the term of this patent subsequent to May 7, 2002 has been disclaimed.

[21] Appl. No.: 703,377

[22] Filed: Feb. 20, 1985

Related U.S. Application Data

[63] Continuation-in-part of Ser. No. 592,989, Mar. 23, 1984, Pat. No. 4,515,635.

[51] Int. Cl.$^4$ ................................................ C04B 7/35
[52] U.S. Cl. .................................... 106/90; 106/314; 166/293
[58] Field of Search ................... 106/90, 314; 166/293; 524/2, 3

[56] References Cited

U.S. PATENT DOCUMENTS

| | | | |
|---|---|---|---|
| 4,011,909 | 3/1977 | Adams et al. | 106/90 |
| 4,015,991 | 4/1977 | Persinski et al. | 106/90 |
| 4,515,635 | 5/1985 | Rao et al. | 106/90 |

*Primary Examiner*—Helen M. McCarthy
*Assistant Examiner*—Steven Capella
*Attorney, Agent, or Firm*—Robert A. Kent; Thomas R. Weaver

[57] ABSTRACT

Cementing compositions and methods of using such compositions in oil, gas and water well cementing operations to reduce fluid loss from the composition to the formation are disclosed. Such compositions incorporate certain copolymers and copolymer salts of N,N dimethylacrylamide and 2-acrylamido, 2-methyl propane sulfonic acid having mole ratios of between 1:4 and 4:1 respectively and average molecular weights of between about 75,000 and about 300,000.

19 Claims, No Drawings

HYDROLYTICALLY STABLE POLYMERS FOR USE IN OIL FIELD CEMENTING METHODS AND COMPOSITIONS

This application is a continuation-in-part of application Ser. No. 592,989 filed Mar. 23, 1984, now U.S. Pat. No. 4,515,635.

BACKGROUND OF THE INVENTION

For oil field cementing operations to be successful, additives which reduce fluid loss are required to be added to the cement. Such additives will be used in well cementing operations where the bottom hole circulating temperatures (BHCT) may range from 80° to 170° F., substantial salt concentrations may be present, and slurry retardation and viscosity are critical aspects as same affect pumpability and compressive strength.

The present invention relates to an aqueous cementing composition and method of using same in cementing oil and gas wells and the like. More particularly, the present invention concerns incorporation of copolymers or salts of copolymers of N,N, dimethylacrylamide and 2-acrylamido, 2-methyl propane sulfonic acid in a hydraulic cement for the purpose of reducing fluid loss during cementing operations.

Certain polymer compositions have long been recognized by those skilled in the art of cementing wells in the petroleum industry as cementing additives useful in reducing fluid loss from a slurry of cement and water to the surrounding environment, i.e. the formation. These compositions are commonly referred to as "fluid loss additives."

An example of a fluid loss additive for use in an acidizing or fracturing composition is found in U.S. Pat. No. 4,107,057. In the '057 patent a copolymer of a sulfonic-acid modified acrylamide and a polyvinyl crosslinking agent is employed.

In the oil well cementing art, a variety of polymers have been disclosed as useful fluid loss additives for hydraulic oil well cements. For example, U.S. Pat. No. 4,015,991 discloses such a fluid loss additive for a hydraulic cement slurry consisting of hydrolyzed copolymers of acrylamide (AA) and 2-acrylamido, 2-methyl propane sulfonic acid (AMPS). However, these AA/AMPS copolymers are useful only in operations where the bottom hole circulating temperature (BHCT) ranges from 90° to 125° F., where as BHCT ranges encountered in such operations are often outside such a range. Still further, these copolymers have a salt tolerance of only up to about 10%.

The temperature limitations of the AA/AMPS copolymers, i.e. loss of usefulness above about 125° F. BHCT, are believed to be the result of hydrolysis of the amide groups. The carboxylate groups formed by such hydrolysis convert the copolymers to materials which function to retard the setting of the cement and to reduce the compressive strength of the set cement. Further, in the lower portion of the above-mentioned temperature range (between 90° and 100° F.) the AA/AMPS is less effective as a fluid loss additive, requiring inclusion of larger amounts of such additive than at higher temperatures. The inclusion of sufficiently large amount of additive to create an acceptable fluid loss composition often creates viscosity and pumpability problems, since the addition of such copolymer directly affects the resultant slurry rheology. Copolymers of acrylamide and AMPS exhibit high viscosity and poor mixability, resulting in cement slurries having poor pumpability characteristics during cementing operations. Mixability is a subjective term used to describe how well the components in the cement composition wet and mix with each other, as well as the energy required to create a generally homogeneous slurry.

Hence, the industry desires a fluid loss additive that has as little effect on compressive strength, set time, viscosity and thickening time as possible; is salt tolerable, i.e. does not exhibit substantial loss of effectiveness in the present of salt; and is chemically stable during cementing operations. Further, such desired fluid loss additive should be compatible with as many other additives and environmental conditions as possible, should be soluble in cement slurries at normal ambient temperature encountered in oil well cementing operations, as well as to continue to provide fluid loss characteristics over broad temperature and cement pH range.

U.S. Pat. No. 4,404,111 discloses the use of copolymers of N,N, dimethylacrylamide and 2-acrylamido, 2-methyl propane sulfonic acid as viscosity control agents in aqueous compositions to facilitate petroleum recovery from subterranean bearing formations. The method of preparing said copolymers uses conventional free radical initiators such as ammonium persulfate and results in copolymers having average molecular weights of greater than about one million. Further, the amount of NNDMA monomer employed in preparing the AMPS/NNDMA copolymer is disclosed as between 70 and about 99.5 weight percent.

SUMMARY OF THE INVENTION

Cementing compositions for use in oil, gas and water well cementing operations are disclosed. More particularly, such compositions are comprised of water, hydraulic cement and certain copolymers or salts of copolymers of N,N, dimethylacrylamide (NNDMA) and 2-acrylamido, 2-methyl propane sulfonic acid (AMPS). Such copolymers or salts of the copolymers are fluid loss additives having a NNDMA/AMPS monomer ratio of between 4:1 and 1:4 and average molecular weights such that a 1000 ppm aqueous solution of said copolymers has a Brookfield viscosity reading at 5 rpm of the U.L. Adapter Spindle in the range between about 30 and about 250 centipoise. The copolymers and salts of the copolymers used in the present invention are relatively stable to hydrolysis over a wide range of temperature and pH. Such copolymers and salts of the copolymers may be admixed in solid form with any dry hydraulic oil field cement or may be added at the time the cement slurry is being prepared, either to the mixing water or to the slurry. Additionally, methods of cementing a conduit in a borehole penetrating an earthen formation by introducing such a cementing composition into the space between such conduit and formation are disclosed.

So that the above-recited features, advantages and objects of the invention, as well as others which will become apparent, are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DESCRIPTION OF THE PREFERRED EMBODIMENTS

New cementing compositions and methods of using same in oil, gas and water well cementing operations are disclosed. Such compositions are comprised of water, hydraulic cementing and a fluid loss reducing additive comprised of a copolymer or salt of a copolymer NNDMA/AMPS wherein said copolymer has a NNDMA/AMPS mole ratio of between 1:4 and 4:1, and a molecular weight such that the Brookfield viscosity reading of a 1000 ppm aqueous solution of said copolymers at 5 rpm of the U.L. Adapter Spindle is in the range of between about 30 and 250 centipoise. More preferably, the Brookfield viscosity reading is between about 130 and about 200 centipoise. Further where such cementing compositions contain salt in an amount up to about 18% by weight of water, then the preferred mole ratio of NNDMA to AMPS is about 1:1.5. Numerous salts of the copolymer can be made, but where cementing compositions contain salt in an amount up to about 18% by weight of water are utilized, the preferred salt is one made by neutralization of the acid form of the AMPS monomer or NNDMA/AMPS copolymer with an alkaline agent such as a source of calcium, magnesium or ammonium ions. Such alkaline agents can comprise, for example, calcium hydroxide, ammonia, magnesium hydroxide and the like.

The cementing compositions of the present invention are useful in oil, gas and water well cementing operations since such compositions have reduced fluid loss to the surrounding formation. Such compositions are used to cement a conduit penetrating a permeable earthen formation via introducing such composition into the space between such conduit and such formation and allowing the composition to harden.

The copolymers and copolymer salts used in the present invention may be manufactured in accordance with various well know free-radical techniques. However, in the present invention new solution polymerization techniques were employed to obtain polymer solutions of NNDMA and AMPS containing 10% by weight of solids. Such polymerization techniques are described in U.S. patent application Ser. No. 592,666 filed Mar. 23, 1984 by S. Prabhakara Rao. The mole ratios of the NNDMA and AMPS monomers are variable, but for the purposes of this invention should not vary in ratio amounts greater than 4 to 1 in either direction.

The salts of the copolymers may be produced in accordance with the various well known techniques. The salt may be formed, for example, by reaction of an alkaline agent with either the AMPS monomer before polymerization or the NNDMA/AMPS copolymer. The salt may be formed with any alkaline agent which does not adversely react with the monomers of the copolymer or the other constituents present in the cementing composition.

A number of materials were tested as potential fluid loss additives, including NNDMA/AMPS copolymers. These tests were performed at 100° F. using Class H cement and 46% water by weight of dry cement. The additive containing cement slurries were mixed in a Halliburton Consistometer and stirred for twenty minutes. The Halliburton Consistometer is a non-pressurized device that simulates a cementing pumping process via movement of the consistometer can about a paddle. Temperature can be varied but pressure is atmospheric. Fluid loss was measured at 1000 psi through a 325 mesh screen in cc/30 min. The results of these fluid loss tests are provided in Table I.

The Table I test results indicate that certain copolymers of NNDMA/AMPS are effective fluid loss additives under static 100° F. temperature conditions.

TABLE I

Fluid Loss Tests on Several Polymers
Base Slurry - Class H Cement + 46% Water - Temperature — 100° F.

| Polymer Name | % Polymer By Weight Cement | Consistometer Reading 0 min | Consistometer Reading 20 min | Fluid Loss in cc/30 min - 1000 psi and a 325 mesh screen |
|---|---|---|---|---|
| Poly dimethylamino propylamino aspartamide | 1.5 | 3 | 7 | 1860 |
| Copolymer of AMPS and NNDMA (1:1) | 0.2 | 4 | 7 | 94 |
|  | 0.4 | 9 | 9 | 28 |
| Copolymer of acrylamide and NNDMA (1:1) | 0.6 | 10 | 11 | 298 |
| Copolymer of AMPS and NNDMA (1:4) | 0.6 | 9 | 9 | 34 |
| Copolymer of acrylamide and DMAEMA (2.8:1) | 0.5 | 4 | 9 | 672 |
| Copolymer of AMPS and cationic methacrylate (2:1) | 0.6 | 3 | 9 | 347 |
| Copolymer of AMPS and DMAEMA (1:2.6) | 0.6 | 4 | 6 | 1491 |
| Homopolymer of NNDMA | 0.6 | 9 | 10 | 330 |
| Homopolymer of DMAEMA | 0.6 | 4 | 9 | 923 |
| Copolymer of Vinylamine and AMPS (1:1) | 0.6 | 3 | 7 | 1128 |
| Copolymer of acrylamide and AMPS (16.5:1) | 0.6 | 15 | 11 | 86 |

NNDMA: N,N, Dimethylacrylamide.
AMPS: 2-Acrylamido, 2-methyl propane sulfonic acid.
DMAEMA: Dimethylamino ethyl methacrylate.

To determine whether copolymers of AMPS/NNDMA are sensitive to temperature variations, tests were conducted in the same manner as above at temperatures ranging 80°, 100°, 125° and 172°. Additionally, various mole ratios of AMPS/NNDMA were evaluated. The results, as provided in Table II, indicate that such copolymers of AMPS/NNDMA are effective fluid loss agents over a broad range of temperatures. Additionally, this data indicates that there is limited fluid loss variation with variation of the mole ratio of AMPS/NNDMA when the amount of AMPS/NNDMA present remains constant at 0.6% by weight of dry cement.

TABLE II

Fluid Loss of Several AMPS - NNDMA Copolymers of Varying Monomer Ratio

| % of AMPS/NNDMA Copolymer by Wt. of Dry Cement | Mole Ratio AMPS/NNDMA | Halliburton Consistometer (Rheology at 0 Min./Rheology after 20 Min.) | | | | Fluid Loss - 1000 psi cc/30 min | | | |
|---|---|---|---|---|---|---|---|---|---|
| | | 80° F. | 100° F. | 125° F. | 172° F. | 80° F. | 100° F. | 125° F. | 172° F. |
| 0.60 | 1:1.5 | 19/16 | 13/12 | 15/11 | 12/10 | 22 | 26 | 26 | 32 |
| 0.60 | 1.5:1 | 7/8 | 6/8 | 5/6 | 5/6 | 34 | 40 | 44 | 58 |
| 0.60 | 2:1 | 10/13 | 9/10 | 8/10 | — | 22 | 24 | 28 | — |
| 0.60 | 3:1 | 7/11 | 7/9 | 6/8 | 5/7 | 24 | 26 | 28 | 44 |
| 0.60 | 3.5:1 | 7/10 | 6/9 | 6/8 | 5/7 | 24 | 26 | 30 | 44 |

Base Slurry: Class H Cement + 46% H₂O by weight of dry cement.
AMPS: 2-Acrylamido, 2-methyl propane sulfonic acid.
NNDMA: N,N, Dimethylacrylamide.

Table III provides test results where the mole ratios of the AMPS/NNDMA copolymers were varied between 1:4 and 3.5:1. Further, the slurries containing these copolymers contained in sea water or salt in an amount of 10%, 18% or sufficient to cause saturation. Although the data found in Table II indicate that variation in the mole ratio of AMPS/NNDMA present in fresh water slurries has little affect on fluid loss properties, results in salt water are much different. The data found in Table III indicates that the copolymers tested respond differently when salt concentrations are varied. As the salt concentration is increased, there is an increase in fluid loss. The copolymer additive was very effective when used in sea water slurries, with fluid loss variance measured between 26 and 46. In a 10% salt by weight of water slurry the fluid loss properties were excellent in the percent additive range of 0.8% or 1.0% by weight of dry cement, except for the 4:1 and 1:3.5 mole ratio of AMPS/NNDMA containing slurries. The slurries containing on 0.6% of additive by weight of dry cement were less effective. To maintain the degree of effectiveness, it is necessary to increase the amount of copolymer additive as the amount of salt is increased. This is further illustrated in the 18% by weight of water and saturated salt slurries. However, it should be noted that as the amount of copolymer additive is increased, the rheology of the slurry also increased. From and operations standpoint, slurries having a rheology measured above about 12–15 Bearden units of consistency on the Halliburton consistometer become less desirable and increasingly less desirable as that number increases.

Although the amount of copolymer present may be varied, a generally effective amount will be from about 0.1% to about 1.5% by weight of dry cement. Such an effective amount will depend on the amount of salt and water present, temperature, average molecular weight of the copolymer, rheological considerations and other additives present.

TABLE III

Fluid Loss and Viscosities of Various AMPS-NNDMA Copolymers In Salt and Sea Water Slurries at 125° F. (Base slurry: Class H Cement + 46% Water by Wt. of Dry Cement)

| Mole Ratio AMPS/NNDMA | % Additive by Wt. of Dry Cement | Halliburton Consistomer Rheology at 0 Min./Rheology After 20 Min. | | | | Fluid Loss - 1000 psi cc/30 min | | | |
|---|---|---|---|---|---|---|---|---|---|
| | | Sea Water | 10% Salt by Wt. of H₂O | 18% Salt by Wt. of H₂O | Sat'd Salt | Sea Water | 10% Salt | 18% Salt | Sat'd Salt |
| 1:4 | 0.6 | 12/12 | 11/15 | 10/11 | 10/9 | 36 | 143* | 153* | 464* |
| 1:1 | 0.6 | 19/10 | 9/10 | 9/10 | 10/14 | 40 | 76 | 138* | 421* |
| 1.5:1 | 0.6 | 15/10 | 9/11 | 8/10 | 9/15 | 34 | 50 | 132 | 474* |
| 2:1 | 0.6 | 9/8 | 7/8 | 9/12 | 10/12** | 38 | 52 | 163* | 563* |
| 3.5:1 | 0.6 | 5/7 | 6/7 | 6/8 | 8/11 | 46 | 360* | 468* | 700* |
| 1:1 | 0.8 | — | 14/14 | 12/15 | 12/17 | — | 28 | 40 | 312* |
| 1.5:1 | 0.8 | — | 10/14 | 10/14 | 8/13 | — | 38 | 90 | 335* |
| 2:1 | 0.8 | 14/15 | 10/11 | 9/11 | 10/14** | 26 | 32 | 120 | 332* |
| 1:1 | 1.0 | — | 20/20 | 15/19 | 13/17 | — | 22 | 24 | 168* |
| 1.5:1 | 1.0 | — | 13/14 | 13/15 | 10/16 | — | 30 | 40 | 208* |
| 2:1 | 1.0 | — | 11/12 | 10/11 | 10/19 | — | 28 | 48 | 179* |
| 3.5:1 | 1.0 | — | 8/10 | — | — | — | 344* | — | — |
| 1:4*** | 0.6 | 30/12 | 14/10 | 15/10 | 23/10 | 156 | 64 | 70 | 287 |

*Calculated
**Slurry tended to gel at the top of the Halliburton Consistometer paddle
***This additive was a copolymer of AMPS and acrylamide having a mole ratio of 1:4 AMPS/acrylamide
AMPS: 2-Acrylamido, 2-methyl propane sulfonic acid.
NNDMA: N,N, Dimethylacrylamide.

When used in cement slurries containing appreciable amounts of salt, the most preferred fluid loss additive copolymer of 2-acrylamido, 2-methyl propane sulfonic acid (AMPS) and N,N, dimethylacrylamide (NNDMA) has a 1.5:1 AMPS/NNDMA mole ratio. Good fluid loss properties are exhibited when the mole ratio of NNDMA:AMPS is varied from about 4:1 to about 1:4. However, as the AMPS:NNDMA mole ratio is varied away from the about 1.5:1 most preferred range, the fluid loss characteristics in such salt-containing slurries are diminished. Such copolymers can be prepared with a variety of molecular weights.

TABLE IV

Brookfield Viscosity Measurements of AMPS - NNDMA (1.5:1 mole ratio) Copolymers of Varied Molecular Weights

| Sample | Percent of Polymer in Solution | Brookfield Viscosity* of a 1000 ppm polymer solution at | | | Viscosity in Centipoise of a 1000 ppm polymer solution at | | |
|---|---|---|---|---|---|---|---|
| | | 1 rpm | 2.5 rpm | 5 rpm | 1 rpm | 2.5 rpm | 5 rpm |
| (1) | 10 | 18 | 41 | 77.5 | 288 | 262 | 248 |
| (2) | 10 | 14 | 30.5 | 58.5 | 224 | 195 | 187 |
| (3) | 10 | 12 | 24 | 48.5 | 192 | 153 | 155 |
| (4) | 10 | 10.5 | 24.5 | 48 | 168 | 156 | 153 |
| (5) | 10 | 9.5 | 21 | 42 | 152 | 134 | 134 |
| (6) | 10 | 3.5 | 7.5 | 15.5 | 56 | 48 | 49 |
| (7) | 10 | 2 | 4.5 | 9 | 32 | 29 | 29 |
| (8) | 10 | 2 | 4 | 8 | 32 | 25 | 25 |

AMPS: 2-Acrylamido, 2-methyl propane sulfonic acid.
NNDMA: N,N, Dimethylacrylamide.
*Measured on RVT instrument with U.L. Adapter.

Eight copolymers having a molar ratio of 1.5:1 AMPS/NNDMA were synthesized. The absolute molecular weights of these polymers were not determined. However, the samples were graded in decreasing order of molecular weight by viscosity using a 1000 parts per million concentration of copolymer in water. The viscosities were measured on a Brookfield viscometer with "New UL Adapter" using "RVT factors" supplied by the manufacturer. Spindle speeds of 1, 2.5 and 5 RPM were used. The values obtained at 5 RPM were used for comparison of viscosities. The polymer solutions were prepared by diluting the stock solutions of the polymers obtained from the polymerization equipment to 1000 ppm. The solid contents of the stock solutions were previously estimated by precipitation of the polymers by acetone and weighing the dried polymer. The viscosities were expressed in centipoise at a given RPM of the spindle. This data is provided in Table IV.

The molecular weight of the copolymer is important for rheological reasons. As the molecular weight of the copolymer is increased, the viscosity of the cement slurry increases, finally reaching a point where it is essentially no longer pumpable. This point is reached when the Brookfield viscosity reading of a 1000 ppm solution of copolymer at 5 rpm of the U.L. Adapter Spindle is somewhere above a reading of 250 centipoise. Such reading corresponds approximately to a molecular weight of about 300,000. On the other hand, when under the same conditions, this Brookfield viscosity reading drops below a value of about 30 (which corresponds to a molecular weight of about 75,000), such copolymer's fluid loss characteristics diminish below an essentially effective level.

Although the proportionality between the solution viscosity and molecular weight of a macromolecule is an established fact, deviations occur with variation in copolymer composition, sequence length of the units, intermolecular and intramolecular interaction between the side chains and the overall conformation of the molecule. Rather simple and accurate results may be obtained when predicting the solution viscosity of a homopolymer of a given molecular weight if a calibration is available, however, the same prediction is more arbitrary in the case of copolymers such as the NNDMA/AMPS copolymers of the present invention which contain strongly ionizing —$SO_3H$ units as well as —$N(CH_3)_2$ groups which can be protonated under strongly acidic conditions. In other words, two samples of the copolymers of the same composition and molecular weight may have widely differing solution viscosities depending on sequence length of the component monomer units, which length is governed by the reaction conditions employed during polymerization.

The Samples (1), (2), (4), (5), (6) and (8) of Table IV were tested for fluid loss properties. Samples (1), (2), (4), (5) and (6) performed similarly in fresh water. Sample (8) did not provide good fluid loss properties in fresh water. Thus, the molecular weight ranges of the copolymers should be between about 75,000 and about 300,000.

Tests relating to WOC (waiting time which is defined as the time required for the slurry to obtain a compressive strength of 500 psi) on cement and 24 hour compressive strengths were made with cement compositions containing copolymers of NNDMA/AMPS having mole ratios of 1:1.5 and copolymers of AA/AMPS having mole ratios of 4:1 are provided in Table V. These tests indicate that cement slurries containing NNDMA/AMPS copolymers provide better compressive strengths and shorter WOC times than cement slurries containing the AA/AMPS copolymers.

TABLE V

Effects of Fluid Loss Additives on Strength Development
Base slurry - Class H Cement + 46% Water

| Additive | Mole Ratio | % Additive By Weight of Dry Cement | Temp (°F.) | Initial Set Time (hr:min) | WOC Time (hr:min) | 24 Hour Compressive Strength (psi) |
|---|---|---|---|---|---|---|
| NNDMA/AMPS | 1:1.5 | 0.6% | 80 | 9:25 | 14:57 | 940 |
| NNDMA/AMPS | 1:1.5 | 0.8% | 80 | 8:57 | 14:26 | 980 |
| AA/AMPS | 4:1 | 0.8% | 80 | 12:32 | 22:40 | 590 |
| NNDMA/AMPS | 1:1.5 | 0.6% | 100 | 7:01 | 10:12 | 1410 |
| NNDMA/AMPS | 1:1.5 | 0.8% | 100 | 6:49 | 10:30 | 1390 |
| AA/AMPS | 4:1 | 0.8% | 100 | 7:00 | 12:06 | 1270 |
| NNDMA/AMPS | 1:1.5 | 0.6% | 120 | 3:58 | 6:10 | 2300 |
| NNDMA/AMPS | 1:1.5 | 0.8% | 120 | 4:24 | 7:06 | 2000 |
| AA/AMPS | 4:1 | 0.8% | 120 | 5:48 | 8:38 | 1760 |
| NNDMA/AMPS | 1:1.5 | 0.6% | 140 | 3:11 | 5:07 | 2550 |

TABLE V-continued

Effects of Fluid Loss Additives on Strength Development
Base slurry - Class H Cement + 46% Water

| Additive | Mole Ratio | % Additive By Weight of Dry Cement | Temp (°F.) | Initial Set Time (hr:min) | WOC Time (hr:min) | 24 Hour Compressive Strength (psi) |
|---|---|---|---|---|---|---|
| NNDMA/AMPS | 1:1.5 | 0.8% | 140 | 3:40 | 6:10 | 2080 |
| AA/AMPS | 4:1 | 0.8% | 140 | 6:36 | 9.58 | 1420 |

Table VI provides rheological and fluid loss test results wherein the NNDMA/AMPS copolymer having a mole ratio of 1:1.5 is neutralized with several bases. The slurries containing these salts of the preferred copolymer also contained salt in an amount of either 0 or 18% by weight of water.

TABLE VI

Effects of Various Salts of a 1:1.5 Molar NNDMA/AMPS Copolymer on Fluid Loss Performance at 125° F.
Base Slurry - Class H Cement + 46% water

| Sample No. | Neutralizing Alkaline Agent | % Equivalent Copolymer Acid by Weight Cement | % NaCl by Weight Water | Halliburton Consistometer Rheology at 0 Min | Halliburton Consistometer Rheology at 20 Min | Fluid Loss 1000 psi cc/30 Min |
|---|---|---|---|---|---|---|
| 1 | None | 0.6 | 0 | 6 | 9 | 34 |
| 2 | None | 0.8 | 18 | 8 | 9 | 114 |
| 3 | NaOH | 0.6 | 0 | 6 | 8 | 30 |
| 4 | NaOH | 0.8 | 18 | 6 | 9 | 226 |
| 5 | KOH | 0.6 | 0 | 7 | 9 | 32 |
| 6 | KOH | 0.8 | 18 | 6 | 10 | 203 |
| 7 | NH4OH | 0.6 | 0 | 6 | 8 | 34 |
| 8 | NH4OH | 0.8 | 18 | 6 | 9 | 135 |
| 9 | Ca(OH)2 | 0.6 | 0 | 5 | 8 | 32 |
| 10 | Ca(OH)2 | 0.8 | 18 | 6 | 8 | 122 |
| 11 | Mg(OH)2 | 0.6 | 0 | 10 | 9 | 38 |
| 12 | Mg(OH)2 | 0.8 | 18 | 7 | 9 | 48 |

The results in Table VI indicate all salts behave very similarly in 0% salt slurries. In 18% salt slurries, the performance of the copolymer salts varies. If the copolymer is neutralized with NaOH or KOH, the fluid loss is higher than that found with the unneutralized copolymer. When NH4OH or Ca(OH)2 is used, the salts give similar fluid loss response to the unneutralized form of the copolymer. The Mg(OH)2 neutralized form of the copolymer has a lower fluid loss than the unneutralized copolymer.

A further advantage of the neutralized salts of the copolymer is the ease of handling such materials. Salts of polymers and copolymers tend to be less hydroscopic which generally results in less lumping of the material during storage. Use of the salts will also eliminate the obvious hazards of handling acidic compounds.

Hence, a preferred fluid loss additive copolymeric compound of NNDMA and AMPS has a mole ratio of about 1:4 to about 4:1 and a molecular weight of between 75,000 and about 300,000. When used in cement slurries containing appreciable amounts of salt, the most preferred fluid loss additive copolymeric compound of NNDMA and AMPS has a mole ratio of about 1:1.5 respectively and a molecular weight between 150,000 and 250,000.

While that which previously is considered to be the preferred embodiment of the invention has been described, it is to be understood that variations and modifications which will become apparent to those individuals skilled in the art can be made in this invention without departing from the spirit or scope thereof.

What is claimed is:

1. A cementing composition for use in oil, gas and water well cementing operations comprising water, hydraulic cement, and a copolymer or copolymer salt of N,N,dimethylacrylamide and 2-acrylamido, 2-methyl propane sulfonic acid or acid salts thereof wherein said copolymer has a N,N,dimethylacrylamide to 2-acrylamido, 2-methyl propane sulfonic acid ratio from about 1:4 to about 4:1 and a molecular weight such that a 1000 ppm aqueous solution of said copolymer has a Brookfield viscosity reading at 5 rpm of the U.L. Adapter Spindle in the range of between about 30 and about 250 centipoise.

2. The composition of claim 1 wherein said copolymer or copolymer salt is present in an amount of from about 0.1% to about 1.5% by weight of cement.

3. The composition of claim 2 wherein said water contains up to about 18% salt by weight of water.

4. The composition of claim 3 wherein the mole ratio of N,N, dimethylacrylamide to 2-acrylamido, 2-methyl propane sulfonic acid in said copolymer is 1:1.5.

5. The composition of claim 1 wherein said copolymer salt is formed by reaction of the polymer units individually or as a copolymer with an alkaline agent capable of producing a salt containing ions of at least one member selected from the group consisting of calcium, magnesium and ammonium ions.

6. A method of cementing a conduit in a borehole penetrating an earthen formation by introducing a cementing composition into the space between said conduit and said formation, wherein said cementing composition comprised water; cement; and from about 0.1% to about 1.5% by weight of cement of a copolymer or copolymer salt of N,N, dimethylacrylamide and 2-acrylamido, 2-methyl propane sulfonic acid or acid salt thereof having a mole ratio from about 1:4 to about 4:1 and a molecular weight also such that a 1000 ppm aqueous solution of said copolymer has a Brookfield viscosity reading at 5 rpm of the U.L. Adapter Spindle in the range of between about 30 and about 250 centipoise.

7. The method of claim 6 wherein the Brookfield viscosity reading of said copolymer is in the range of about 130 and 200.

8. The method of claim 7 wherein said water contains up to about 18% salt by weight of water.

9. The method of claim 8 wherein the mole ratio of N,N, dimethylacrylamide to 2-acrylamido, 2-methyl propane sulfonic acid in said copolymer is about 1:1.5.

10. The method of claim 6 wherein said copolymer salt is formed by reaction of the polymer units individually or as a copolymer with an alkaline agent capable of producing a salt containing ions of at least one member selected from the group consisting of calcium, magnesium and ammonium ions.

11. The method of claim 6 wherein said copolymer is a calcium salt.

12. The method of claim 6 wherein said copolymer is a magnesium salt.

13. The method of claim 6 wherein said copolymer is an ammonium salt.

14. A method of cementing a conduit penetrating a permeable earthen formation by introducing a cementing composition into the space between said conduit and said formation and allowing said composition to harden, wherein the improvement comprises the use of a cementing composition comprising water, wherein said water contains salt in an amount of up to about 18% by weight of said water; cement; and from about 0.1% to about 1.5% by weight of cement of a copolymer or copolymer salt of N,N,dimethylacrylamide and 2-acrylamido, 2-methyl propane sulfonic acid or acid salt thereof having a mole ratio from about 1:4 to about 4:1 and a molecular weight from about 150,000 to about 250,000.

15. The method of claim 14 wherein the mole ratio of N,N, dimethylacrylamide to 2-acrylamido, 2-methyl propane sulfonic acid in said copolymeric or copolymeric salt compound is about 1:1.5.

16. The method of claim 14 wherein said copolymer salt is formed by reaction of the polymer units individually or as a copolymer with an alkaline agent capable of producing a salt containing ions of at least one member selected from the group consisting of calcium, magnesium and ammonium ions.

17. The method of claim 14 wherein said copolymer is a calcium salt.

18. The method of claim 14 wherein said copolymer is a magnesium salt.

19. The method of claim 14 wherein said copolymer is an ammonium salt.

* * * * *